US005650018A

United States Patent [19]

Müller

[11] Patent Number: 5,650,018

[45] Date of Patent: Jul. 22, 1997

[54] METHOD AND APPARATUS FOR THE SCORING OF AND THE PREPARATION FOR MILLING OF CEREAL

[75] Inventor: Roman Müller, Niederuzwil, Switzerland

[73] Assignee: Buhler AG, Uzwil, Switzerland

[21] Appl. No.: 416,671

[22] PCT Filed: Aug. 10, 1994

[86] PCT No.: PCT/CH94/00160

§ 371 Date: Jun. 14, 1995

§ 102(e) Date: Jun. 14, 1995

[87] PCT Pub. No.: WO95/04595

PCT Pub. Date: Feb. 16, 1995

[30] Foreign Application Priority Data

Oct. 10, 1993 [DE] Germany .......................... 43 26 836.6

[51] Int. Cl.[6] ................................ B08B 9/20; A23K 3/02

[52] U.S. Cl. ........................................... 134/25.3; 426/419

[58] Field of Search ................................ 134/25.3, 25.1; 99/501, 519, 523; 241/86; 426/419, 506, 507, 518

[56] References Cited

U.S. PATENT DOCUMENTS

| | | |
|---|---|---|
| 4,292,890 | 10/1981 | Salete-Garces . |
| 4,741,913 | 5/1988 | Satake . |
| 5,025,993 | 6/1991 | Satake . |
| 5,036,757 | 8/1991 | Müller . |
| 5,082,680 | 1/1992 | Tkac . |
| 5,186,968 | 2/1993 | Wellman . |
| 5,211,343 | 5/1993 | Wellman . |
| 5,240,733 | 8/1993 | Tkac . |

FOREIGN PATENT DOCUMENTS

| | | |
|---|---|---|
| A-0012790 | 7/1980 | European Pat. Off. . |
| 9012355.7 | 8/1980 | Germany . |
| 3809026A1 | 2/1989 | Germany . |

OTHER PUBLICATIONS

Die Mühle + Mischfuttertechnik, Jul. 19, 1973.
International Search Report (PCT/CH 94/00160) dated Oct. 28, 1994 (Mailed Nov. 14, 1994).

*Primary Examiner*—Jill Warden
*Assistant Examiner*—Alexander Markoff
*Attorney, Agent, or Firm*—Finnegan, Henderson, Farabow, Garrett & Dunner

[57] ABSTRACT

The new invention proposes a new method and an apparatus for the preparation of cereal for milling. Before conditioning, the grain is cleaned in a first dry stage and a second moist or wet stage, and the main quantity of water is added before or during the second stage, the grain for the moist or wet cleaning being in intermediate storage for 1 to 120 minutes. Preferably a continuously operating scouring machine is used for the dry cleaning as well as for the moist or wet cleaning, the grain being forcibly conveyed from the inlet to the outlet by conveying means and processed by areas of noses arranged alternately with the conveying means, and the material abraded by the scouring is repeatedly separated out with the rotational movement of the rotor.

11 Claims, 7 Drawing Sheets

METHOD AND APPARATUS FOR THE SCORING OF AND THE PREPARATION FOR MILLING OF CEREAL

TECHNICAL FIELD

The invention relates to an apparatus and method for the scouring of cereal in a scouring chamber formed by a scouring shell and a scouring rotor, the grain stock being moved by the working elements of the scouring rotor from an inlet to an outlet.

BACKGROUND ART

The preparation of cereal for grinding more particularly for high-grinding, comprises a plurality of method steps:

- the screening out of sand and clods,
- the sorting out of various foreign particles, for example stones, seeds, and husk fragments,
- the removal of adhering dirt,
- moistening of the cereal from storage moisture (e.g. 10–12%) to grinding moisture (to over 15% water content),
- conditioning the cereal for 12 to 48 hours,
- possibly also a scouring or peeling of individual skin parts, or the whole grain skin.

The cereal grain has basically a threefold skin structure. The outermost skin consists of outer layer, longitudinal cells, transverse cells and tubular cells, which make up about 5.5% of the entire grain. There follows a central double layer, the so-called colour layer as well as a colourless layer, taking up about 2.5% of the grain. The innermost layer amounts to 7% of the grain weight, and is called the aleurone layer. There remain the embryo or germ, with 2.5%, and the large remaining part the endosperm which amounts to about 82.5% of the entire grain. A known problem area in the production of wholemeal, brown and white flours, also middlings and semolina, involves the germ, since the germ has a high fat content. The germ is a valuable component, and is suitable for example for the extraction of oil. But it is the fat which in the broken-open state of the germ limits the keeping qualities of the milling products especially when there is a considerable germ fraction. The miller aims to remove all germ in the milling process with as little damage as possible. Therefore, the cereal grain is to be conducted along with the germ as far as possible without damage up to the first grinding stage.

The recent past has been marked by two tendencies. Firstly by reducing, for economic reasons, the number of machines or apparatus for the cleaning stage or preparation for milling. The aim was in the direction of using just dry sorting machines, wetting of the cereal, and as small conditioning cells as possible. According to the second tendency it has been proposed, quite the opposite, to peel and polish the milling cereal through many stages to almost the endosperm, similarly to what happens in rice milling.

For example according to DE-PS No. 1 164 210 it was proposed to remove the outermost layers completely. Depending on the type of cereal 3.2–5.7%, i.e. to some degree the entire outer skin formation, is taken off by repeated moistening, stripping and sifting. The removal of such large skin fractions has to be prepared and accompanied by carefully controlled and repeated treatment of the grain, wherein in addition to the moisture, heat has also been applied over a sufficient influence time, with moderate movement.

The applicant company itself, according to CH-PS No. 640 750, proposed so to speak a middle road of peeling off 6–10% of the grain, or 50–60% of the grain skin, be-before grinding. For this, four successive method steps are proposed: dry cleaning—moist peeling—intensive wetting—roller grinding. But for economic or viable-operation reasons that method was un-successful as regards becoming established in actual practice.

In a still earlier proposed solution according to GB-PS No. 1 258 230, to increase the yield, the various skins are repeated "batchwise" treatment. Although this complete-peeling method has now been known for over two decades, it has not become established in actual practice.

In recent times it has again been attempted, according to U.S. Pat. No. 5,025,993, to carry out some of the operations of the usual milling process within the preparation-for-milling stage by a systematic and repeated total scouring and peeling. But very extensively arranged practical tests showed no advantages, at least as regards the overall economy. On the contrary, in the case of complete grain peeling, very moist skin fractions are produced which have to be separately treated and in part dried. Most of the tests gave no higher yield of white flours and semolinas. The outlay for the milling process per se cannot be substantially reduced this way. The U.S. Pat. No. 5,025,993 is based on what happens in peeling and polishing practice in the milling of rice. The actual disadvantage is that each individual machine has only a very small throughput, so that a large number of individual machines is needed in the case of high outputs of e.g. 20–40 t/h.

SUMMARY OF THE INVENTION

The invention has as an object to improve the preparation for milling without causing disadvantages for grinding, more particularly to bring the grain to a high degree of cleanness without grain fracture, even in the case of high throughputs. A further part-object was that a higher degree of constancy in the input parameters influencable for the grinding work is to be made possible.

The method according to the invention is characterised in that a bed of grain stock is produced in the scouring chamber as a dense packing, and the working elements of the scouring rotor consist alternately of a plurality of or areas of projecting noses, and also forced-conveyance conveyance means which extend into the dense packing, the noses mainly moving the individual grains, and the forced-conveyance means producing an axial movement. If the actual form of the working elements according to the invention is considered, the impression is obtained that these comminute the grain or at least produce very many grain breakages. But with experimental tests exactly the opposite could be shown to be the case, to the surprise of all the participating persons skilled in the art. Up to a considerable scouring effect of e.g. 2% almost no grain breakage occurred. The applicant company developed with great success a similar-appearance maize peeling machine (EP-PS No. 327 610). In deskinning maize the intention is to break open the maize grain, detach the germ, and completely separate-off the skins. Thus the aim when deskinning maize is exactly the opposite of pre-milling preparation of cereals e.g. for the production of bakers' flour, middlings and semolina. It needs a look into the scouring chamber of the new invention to make the fundamental difference clear. According to the new invention the forming of a dense packing constituted by a bed of grains is required. The working elements have several quite specific functions. The individual projecting or freestanding noses exert a very strong movement effect on the individual grain, so that above all an intensive grain-on-grain friction is produced, and a non-aggressive and yet very effective scouring is obtained. The worm-type forced-conveyance means ensure the desired throughput of stock, but also co-operate with the noses so that the greatest possible movement of individual grains is forcibly brought about. The noses because of their revolving movement impart a rotating basic movement to the individual grains. As regards models, the new invention makes use of two known techniques. The sole task of ball mills is grinding work, more particularly through the rolling work of the balls. With a ball mill, naturally there is a desire not to damage the balls themselves. The balls of the ball mill can be compared to cereal grains with regard to movement in a dense packing. The second model is a homogenisation and pressure worm. In such a worm, completely different physical influence parameters are used. For example there is a very strong mixing effect, a rubbing effect between the stock particles or relatively to the machine parts. The basic idea of the homogenisation and pressure worm resides, on the basis of friction, in a rotational movement with an axial conveying component, which through the hold-back due to an appropriate surface structure for the worm housing, has the effects : mixing, friction, scouring, pressure etc. The desired work is based in the last analysis on the "poor degree of conveyance efficiency" of the conveying worm. The mixing causes an intensive changing of location and attitude of all the particles, and allows scouring of the grain which is uniform all round. The solution provided by the invention can use some of these effects very advantageously.

Preferably the scouring shell also has a plurality of noses which project into the scouring chamber and which in co-operation with the working elements of the scouring rotor intensify the movement of the individual grains. In a particularly preferable feature the scouring shell has, alternating in the circumferential direction of the working elements, a plurality of noses, or a plurality of areas of noses, and screen areas through which the abraded material from scouring is separated off.

The invention further relates to a method for the scouring and pre-milling preparation of cereal for the production of for example wholemeal flours, white flours, middlings and semolina, the cereal being cleaned in a plurality of stages, grinding moisture is achieved by dosaged addition of water, and the cereal is fed to a conditioning compartment and to grinding, characterised in that before the conditioning the cereal is scoured in a first dry stage and a second moist or wet stage, the main water quantity being added before or during the second stage, and the grain for the moist or wet scouring is kept in intermediate storage for 1 to 120 minutes and is passed to the conditioning stage only after the second moist or wet stage.

With the invention it was possible to confirm that over decades up to the present day the real basic operations: cleaning—wetting—conditioning—milling for the production of the most varied milling products have been controlled at a high level. But all the presumed optimisation attempts of more recent times, with much overlapping or mixing of the basic operations, have afforded advantages only for particular partial aims. Taken together, on the other hand, their effect has been rather a retrograde one for the practical world of milling. Therefore, milling practice declined the aforesaid proposals. Within the context of the industrial processing of all plant seeds, especially of the various cereal types, high-grinding is recognised as setting the highest requirements. The rice grain has a round, markedly convex shape, so that in rice milling it is technologically not difficult to abrade all the skin parts off down to the endosperm. Rice is traditionally polished. But, owing to the deep furrow, the wheat grain has both concave and convex forms, and the furrow takes up about 20–30% of the entire grain skin. Working action after the manner of rice polishing cannot reach this very furrow region. The skin fraction situated internally in the concavity has had to be detached during the multiple grinding and screened out as hitherto. Thus the abrading and polishing of the wheat grain for grinding affords no direct advantages at all.

The second incorrect way of thinking as far as all the aforesaid proposals were concerned was connected with the cleaning per se. Grain cleaning is directed to four main aims:

removal of all foreign seeds, removal of all impurities and skin pieces, reduction of bacteriological impurities, obtaining an intact grain.

For obvious reasons, in plant grains the dirt is on the surface and, apart from the furrow, never in the inside of the grain. The endosperm is in principle sterile. Then, if the skin parts are peeled off, by immediately apparent logic, all dirt and all microbes are removed. But since the various skin layers of the grain can be most effectively removed with moisture more particularly after 12 to 24 hours conditioning, hitherto each intensive peeling has been carried out either only after the conditioning or with multiple alternation of peeling and moistening. It was overlooked that the quantity of microbial life is not a simple question of statistics. Because of their own ability to multiply, or double for example within 30–60 minutes, given ideal conditions in each particular case as regards nutrient basis, heat, moisture, a germs total above the permissible value can develop within 24 hours. Many microbes have in fact optimum multiplication conditions which are identical to the optimum conditions for milling preparation.

The invention now proposes dividing the preparation for milling into two main operations : cleaning and conditioning, and the cleaning itself into three method steps, namely a dry cleaning, a moist or wet cleaning, and intermediate storage as well.

The grain is first of all to be dry cleaned as satisfactorily as possible, and only then brought with wetting water to a higher moisture content, and this is made to act on the skin. The majority of the dirt material is removed in the course of the dry cleaning. At the same time the number of germs, if initially increased, is reduced. Within a period of 5 to 120, preferably 10–90 minutes, of intermediate storage at the most a doubling of the numbers of germs can come about. The second moist or wet cleaning makes it possible subsequently to achieve the maximum possible removal of impurities whether adhering dirt or microbes, and thus to achieve a grain mass having an extremely high standard of cleanness, so that the subsequent conditioning of the complete grain in the conditioning compartment for 12 to 48 hours can without disadvantage be arranged in dependence on the optimum requirements of grinding in that particular case. In this way the overall treatment process is divided into a first non-clean sector and a second completely clean sector, beginning from the transfer of the cleaned grain into the conditioning compartments. Cleaning is concentrated, and is carried out and concluded with the shortest possible time outlay.

The invention also permits of a large number of especially advantageous developments. Preferably the grain is subjected to surface treatment in the moist or wet cleaning. A proportion of the outermost grain skin material is scoured off, and the abraded material is separated from the grain stock at once, preferably 0.3 to 2% being scoured away from the grain. Particularly preferably the grain is subjected in the dry cleaning stage to a more superficially active scouring, avoiding the scouring-away of the outer grain skins. The cleaning is thus brought back to what it ought to be, namely bringing both each individual grain and also the entire grain mass to a higher degree of cleanness without damaging the grain. Any exposure of the endosperm or breaking-open of the grain germ is thus obviated. At the same time the grain is wetted by the addition of wetting water, so that the moist or wet second cleaning can be carried out more efficiently. The skin structure of the grain remains intact except for a fraction of the outermost skin, and protects the endosperm as far as the first grinding passage. By removing part of the outermost skin, in many cases environmentally toxic substances present there in concentrated form can be removed at the same time as well. Only unclean parts are removed in the cleaning, so that this unclean fraction can be passed to a special disposal means. The remainder of the grain, endosperm and germ and bran, comprises valuable components and can be passed in optimum manner to specific utilisation arrangements. According to a further feature, during the intermediate storage, at least at times, the cereal has a gaseous medium flowing through it preferably using circulation air in the intermediate store. In this way, any possible increase in the number of germs during the intermediate storage time can be suppressed. Where there are special requirements the moist or wet cleaning can be multiple of multi-stage cleaning. In this case, intermediate storage of 1 to 10, preferably 2 to 5 minutes, suffices, and can be carried out at least in part in a wetting apparatus. Moreover, either via the wetting liquid or via the gaseous medium, heat or possibly cold can be taken into the stock for cooling, and the latter brought to predeterminable values. Preferably the grain moisture is measured after the moist or wet cleaning, compared by computer means with a predetermined moisture, and the water addition is corrected by appropriate control means. A preselectabie moisture for milling can be set in this way.

Tests have confirmed that the combination of forced conveyance with the scouring and simultaneous separating-off of the abraded material from the scouring obviates damaging the grain, and nevertheless an unexpectedly high standard of cleaning effect is achieved. From the outlet region a holding-back action is exerted on the cereal, and in the working space between rotor and scouring shell a dense bed of grains about 1–5 grains thick is produced, and preferably the roughness of the grater surfaces, or the corresponding grater profile, is greater than the size of a cereal grain. With the rotational movement of the rotor, the bed of grains is subjected to a continual alternation of grating and movement in rotational and forward directions. The rotational and forward movement is kept constant, so that the scouring intensity can be set by adjustment or regulation of the holding-back effect or on the basis of the current consumption of the drive motor.

The invention further relates to an apparatus for preparing cereal for milling, for the production of for example flour, middlings and semolina, and the cereal is cleaned in a plurality of stages, the moisture for milling is achieved by a dosaged addition of water, the cereal is stored in a conditioning compartment and passed to grinding, and the apparatus is characterised in that it has a first dry cleaning or scouring, and a second moist or wet cleaning, and also the second cleaning is arranged before the conditioning compartments and an intermediate store is arranged in the second cleaning between a device for adding water and a cleaning machine.

An especially advantageous form of the apparatus according to the invention for the scouring of cereal, having a scouring shell and a scouring rotor which is provided with working elements, these together forming a scouring chamber through which the cereal is conveyed by the working elements via an inlet to an outlet, is characterised in that the scouring rotor has alternately areas of noses projecting into the scouring chamber and forced-conveyance means for the axial movement of the grain material.

The apparatus according to the invention permits of a large number of particularly advantageous constructional forms. The working elements of the scouring rotor are arranged, alternating in the circumferential direction, as areas of projecting noses and of worm-shaped forced-conveyance means. Preferably the scouring shell also has areas of projecting noses which project into the scouring chamber, and the height of all the working elements is in the same order of magnitude as the free spacing (rotor clearance) between the working elements e.g. between 5 and 15 mm. The forced-conveyance means are advantageously arranged on support strips which extend over the main length of the scouring rotor and in the region of the inlet are constructed preferably as a feed screw or worm.

The rotor is constructed as a hollow body, and the feed worm is provided preferably with a relative considerable worm depth relatively to the forced-conveyance means in the downstream scouring chamber. The working elements can be constructed on a plurality of e.g. 6 to 10 support strips mountable on the rotor, these each extending over the entire rotor length and having corresponding areas of noses and/or forced-conveyance means. The rotor can have at least 3 each, preferably 4 each, longitudinally disposed areas of noses and forced-conveyance means alternating in the circumferential direction. The scouring shell over its entire surface either has only scouring elements or can have circumferentially alternating e.g. 3 each or 4 each screening and scouring sections. The scouring shell can consist of stationary annular screening sections and of areas of noses which can be adjusted or fed towards the rotor, and the dense packing of the grain stock bed can be produced preferably by an adjustable, preferably controllable, valve.

The invention will now be described hereinafter with further details with reference to a plurality of constructional examples.

DESCRIPTION OF THE PREFERRED EMBODIMENT

Figure 1:
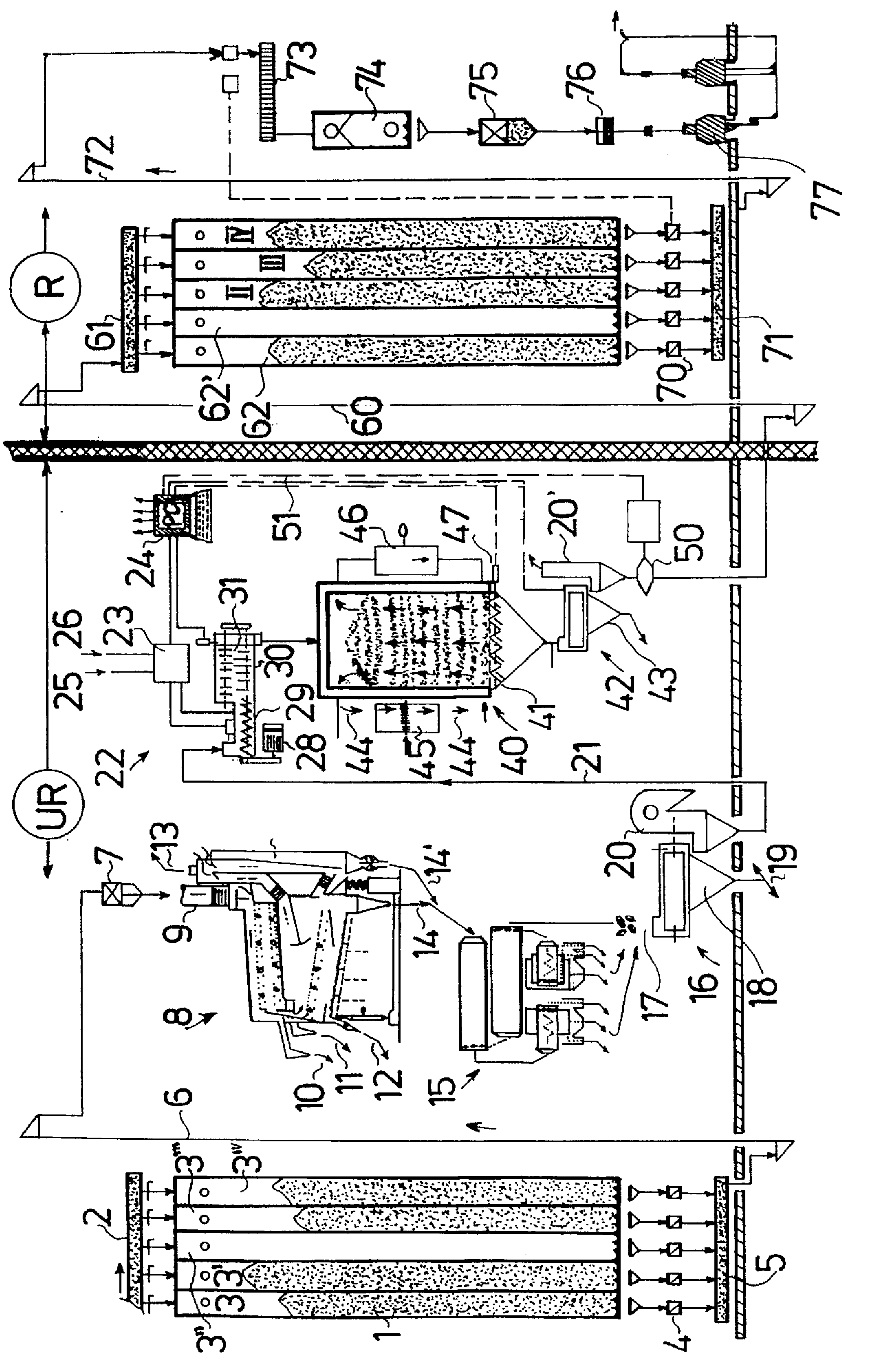
FIG. 1 is a diagrammatic view of a preparation for milling apparatus.
Figure 2:
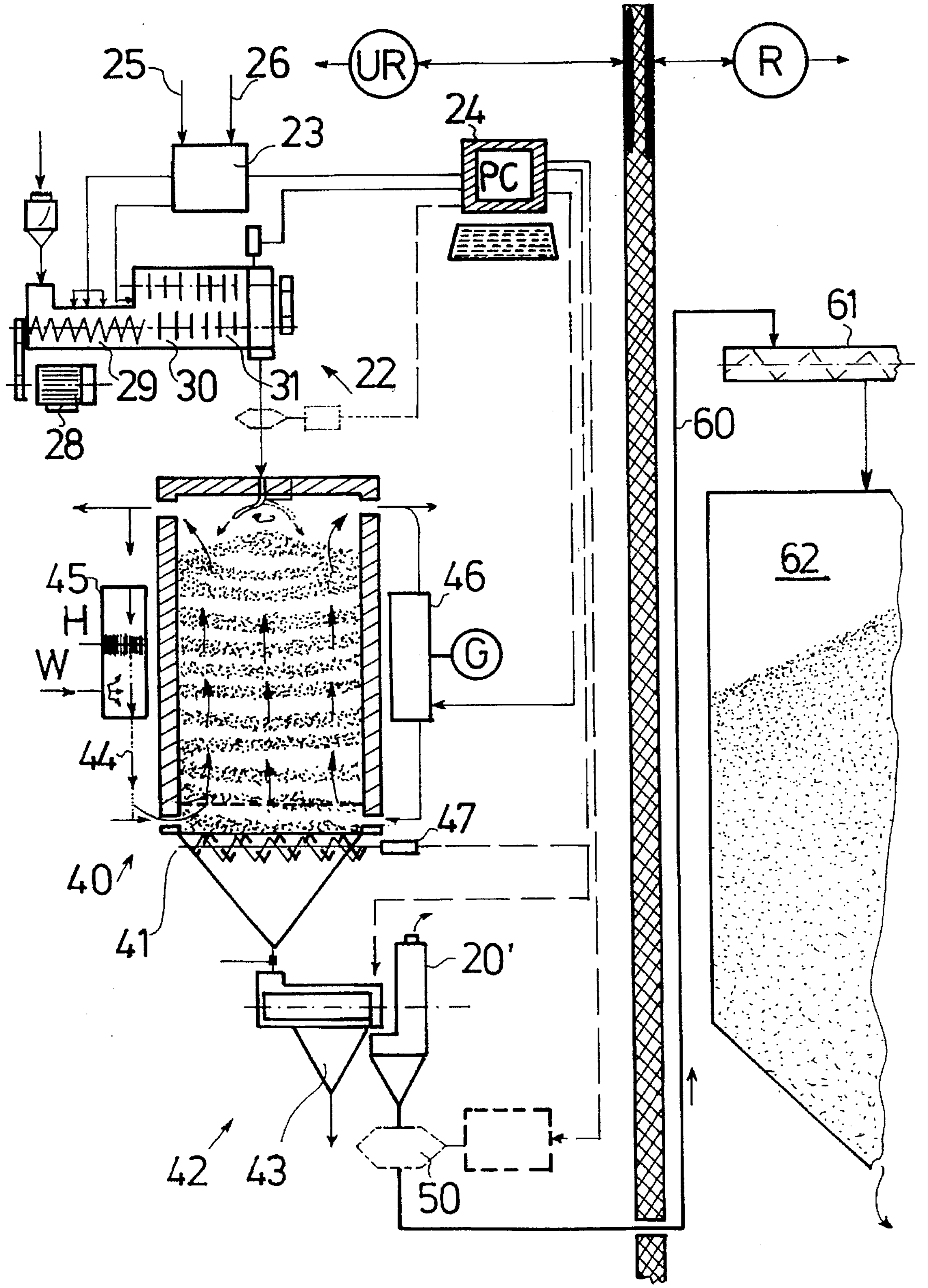
FIG. 2 shows the moist or wet cleaning stage on a larger scale.

Reference will now be made to FIG. 1. The so-called raw grain material 1 is brought to readiness for processing via a distribution conveyor 2 into the respective raw grain material compartments 3, 3$^{I}$ to 3$^{IV}$. The raw grain material is non-cleaned or only partly cleaned cereal. Usually the cereal is previously freed of the coarsest impurities by means of sieves and suction systems, without carrying out individual-grain cleaning. The raw grain compartments further serve to make ready various sorts; of cereal which downstream by means of quantity regulators 4 are mixed together in accordance with pre-selected quantity and percentage fraction values by means of a collecting worm 5. The raw grain material mixture is then transferred upwards via an elevator 6 and conducted by means of a weighing machine 7 into the first pre-cleaning stage 8 of the dry cleaning system, which represents a combination of a size grading in the upper portion and a weight grading in the lower portion, such as is described for example in EP-PS No. 293426. The raw grain material is introduced through an inlet 9 of the pre-cleaning stage 8, and via an outlet 10 relatively large foreign bodies so-called clods are separated out and taken away, via an outlet 11 fine sand, via the outlet 12 stones, and via an outgoing air conduit 13 fine dust. The cereal is thereafter fed via a connecting conduit 14 or 14' to a sorting apparatus 15. By means of the sorting apparatus 15 most of the foreign seeds such as round and long grains, oats, barley, vetch etc., also corn cockles and corn fragments can be sorted out. The cereal for milling is passed as the main fraction to a dry scouring machine 16 by way of an inlet 17, where now for the first time an intensive surface cleaning of each individual grain takes place. The dry abraded material from scouring is taken away via a collecting hopper 18 and a discharge conduit 19. The grain stock is freed in a winnower 20 of loose skins and of all abraded material from scouring, and fed via a conveyor 21 as dry-cleaned stock continuously into a wetting device 22. The wetting device, 22 can be of any constructional type, the important thing being that a quantity of wetting water determinable by means of a computer 24 can be added by means of a regulating device 23 through an appropriate wetting water conduit 25. Additionally to or instead of the water, steam may also be used via a steam supply conduit 26 for wetting the cereal. The wetting device can be constructed in accordance with the proposal in the CH patent application No. 02 411/92-8, to the entire content of which the reader is referred to here. The wetting device 22 has a drive motor 28, an infeed conveyor 29, and a wetting chamber 30 with acceleration rotors 31 mounted rotatably therein. The freshly wetted cereal is then stored in an intermediate store 40 for up to 120 minutes. By means of a discharge dosaging feeder 41, after a pre-selectable time the cereal is transferred to a moist or wet scouring machine 42, 0.2 to 2% being scoured from the grain depending on the task involved, and here also the dust from scouring is discharged through the collecting hopper 43 directly. A further interesting feature idea is to carry out an additional treatment in the intermediate store 40 with conditioned air 44 via an air preparation system 45 with controlled temperature and air moisture, preferably with a circulation air arrangement. But it is also possible to produce in the intermediate store 40 a particular gas atmosphere e.g. with $CO_2$ by means of a gas supply device 46. The intermediate store 40 could also have a bed rearranging device associated with it but preferably it is used as a continuous through-type apparatus. The cereal temperature is ascertained by means of a probe 47, likewise the effective grain moisture after cleaning, which is measured for example by means of a microwave measuring unit 50. Both values are fed via a data bus system 51 to the computer 24, which co-ordinates all operations as well on the basis of superordinated desired values. In the intermediate store the cereal can be heated to a constant temperature of 20° C. and cooled if necessary. With the entire arrangement it is possible to effect a suitable correction in the event of varying moisture in the cereal for milling after the moist or wet cleaning by means of the moisture actual value and a comparison with a desired value either through the air preparation system 45 or through the wetting device 22. Up to then however all the method steps within the non-clean sector UR have been carried out with the minimum possible dwell time of at most two hours. Thereafter the cereal for milling, now cleaned to the highest standards and wetted, is transferred to the mill side, which is a clean sector R, and introduced through a further elevator 60 and a distribution conveyor 61 into a preselectable one of conditioning compartments 62 to 62$^{IV}$, in which the cereal is now conditioned for example for 12 to 24 hours. Then the cereal for milling is fed by way of a throughflow regulating device 70, a horizontal conveyor 71 and an elevator 72 to a further wetting device 73, wherein only for example 0.1 to 0.5% water is added for the purpose of moistening the surface of the grain. After a short rest period in a B 1 store 74 the mill input value is ascertained with the so-called B 1 weighing machine 75, and the stoel is transferred via a safety magnetic separator 76 to the first milling stage, or the first grinding roller stand 77. Thereafter the products milled are obtained in a manner known per se with the high-grinding system.

Figure 3:
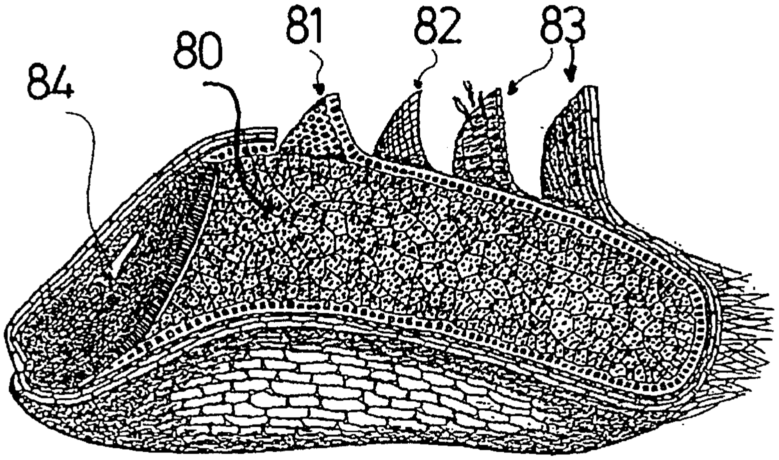
FIGS. 3, 3*a* and 3*b* show per se known sections through a wheat grain.
Figure 3B:
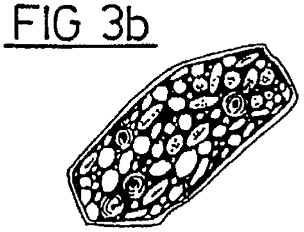
Figure 3A:
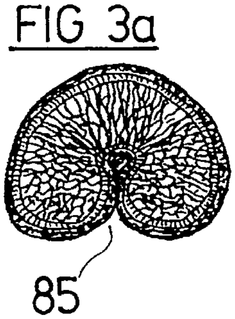

FIGS. 3, **3*a* and 3*b* each show a per se known section view through a cereal grain. The grain consists preponderantly of the endosperm 80, the aleurone layer 81, a testa 82 and a pericarp 83, also an embryo 84. The particular characteristic of the wheat is the so-called furrow 85, which forms a fraction of 20 and more percent of the various layers 81–83**.

Figure 4:
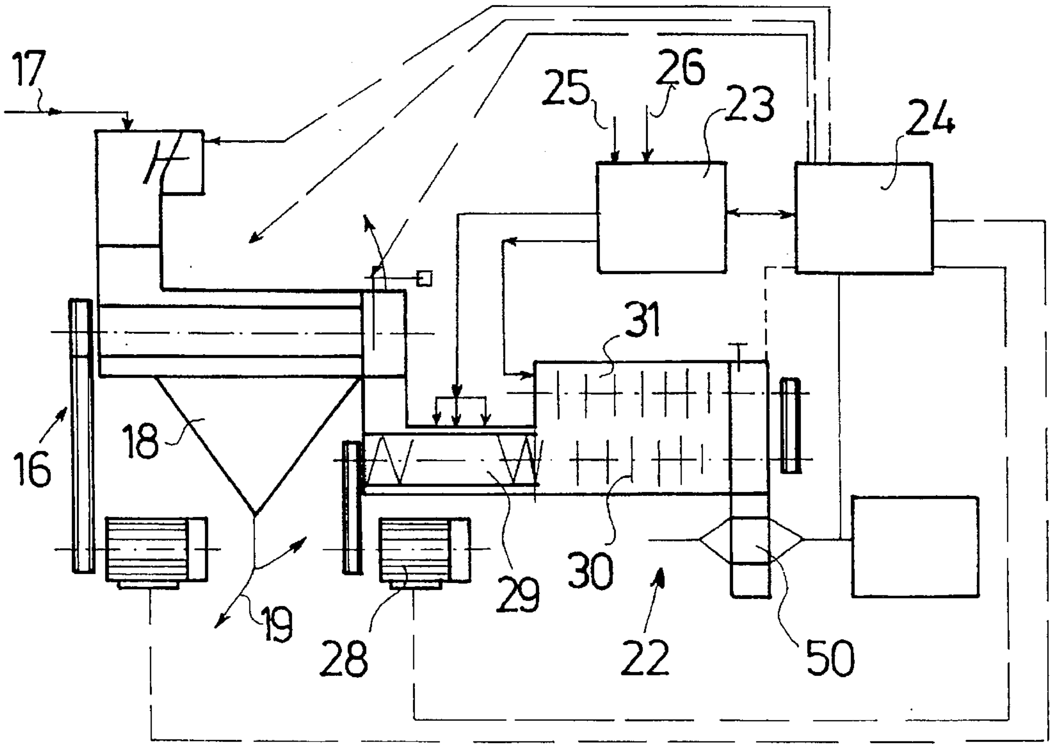
FIG. 4 shows combined dry scouring with subsequent moistening.

FIG. 4 shows a combined machine, wherein the dry scouring machine 16 and the wetting device 22 are combined to constitute a sub-assembly as in FIG. 1. FIG. 4 also shows that the two units also have a control and regulating unit. Both the degree of scouring and the value of wetting can be controlled with the use of preset desired values.

Figures 5, 6:
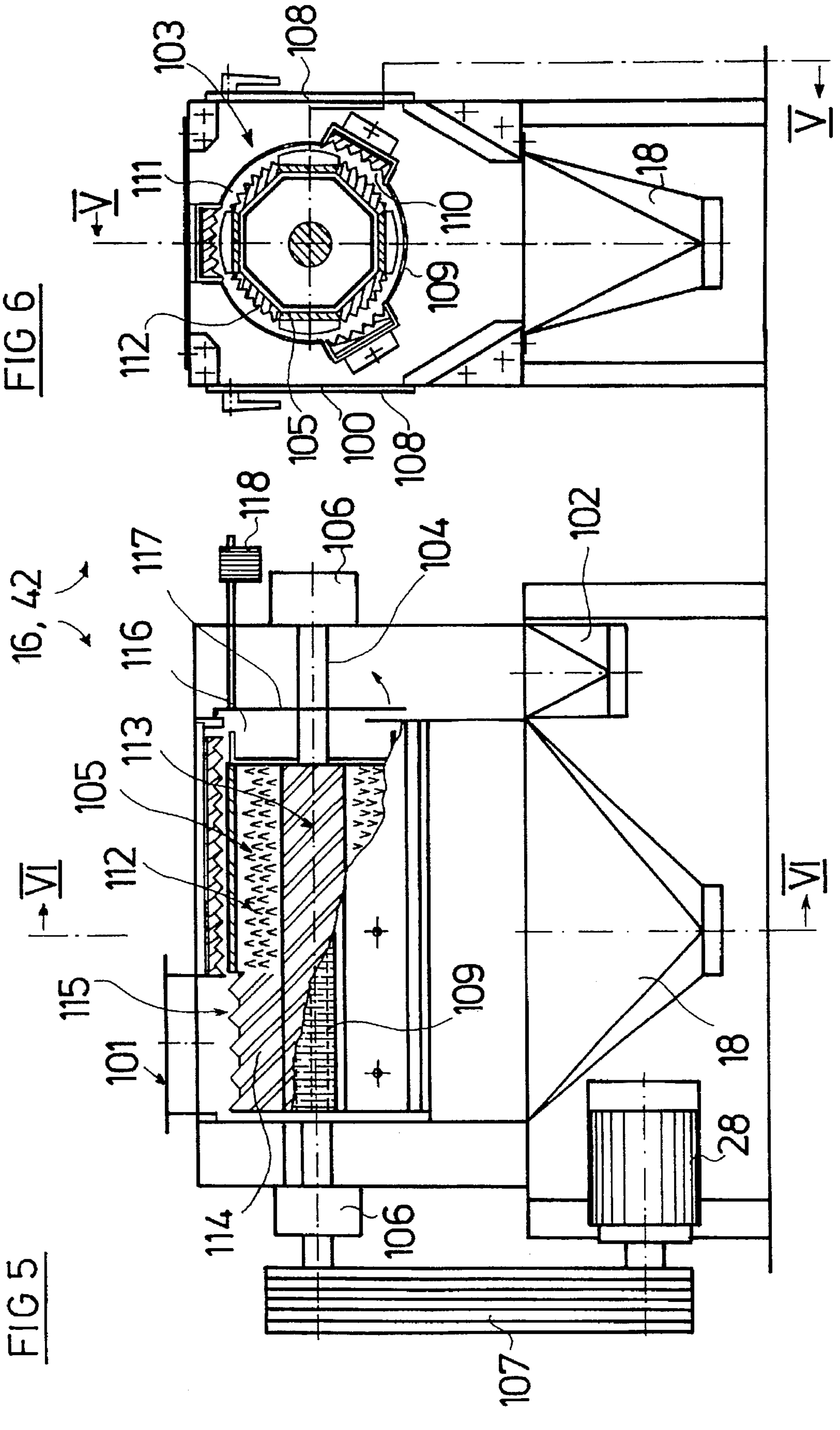
FIG. 5 shows a grain scouring machine on a larger scale.
FIG. 6 is a view in section on VI—VI of FIG. 5.

The dry scouring machine 16 and, respectively, the moist or wet scouring machine 42 are shown on a larger scale in FIGS. 5 and 6. The scouring machine has a working housing 100, with an inlet 101 and an outlet 102 for the cleaned cereal. Within the working housing 100 a cylindrical scouring shell 103 is arranged in a stationary manner, and within the scouring shell 103 there is situated a rotor 105 which is movable in rotational movement about an axis, and which is mounted at both ends in bearings 106, and is driven by a drive motor 28 via a belt drive 107. The working housing 100 further has at its two sides inspection and service doors 108, and opens in its central portion into the collecting hopper 18 through which material abraded in the course of scouring is discharged. The scouring shell 103 consists of screening sections 109 and grater areas 110, the grater areas being preferably adjustable towards and away from the rotor 105, for adjusting the effective working gap between the rotor 105 and 110. In the example shown in FIGS. 5 and 6 the scouring shell 103 has three each screening and scouring sections, or grater areas 110, alternately, so that the scouring-abraded material is removed immediately after it is produced from the working chamber 111 through the screening sections. The rotor 105 itself is of 4-part construction, with alternating arrangement of the grater areas 112 and conveyance means 113 with the exception of an inlet portion in the working chamber 111. The conveyance means 113 extend over the entire length of the working chamber 111 and are supplemented by corresponding feed worm elements 114 distributed over the entire circumference, and in the region of the inlet 101 form a feed screw or worm 115. Arranged in the outlet region 116 is a hold-back flap or valve 117 which for the simplest cases can be adjusted by displaceable weights 118 for a respective degree of peeling intensity.

Figure 7:
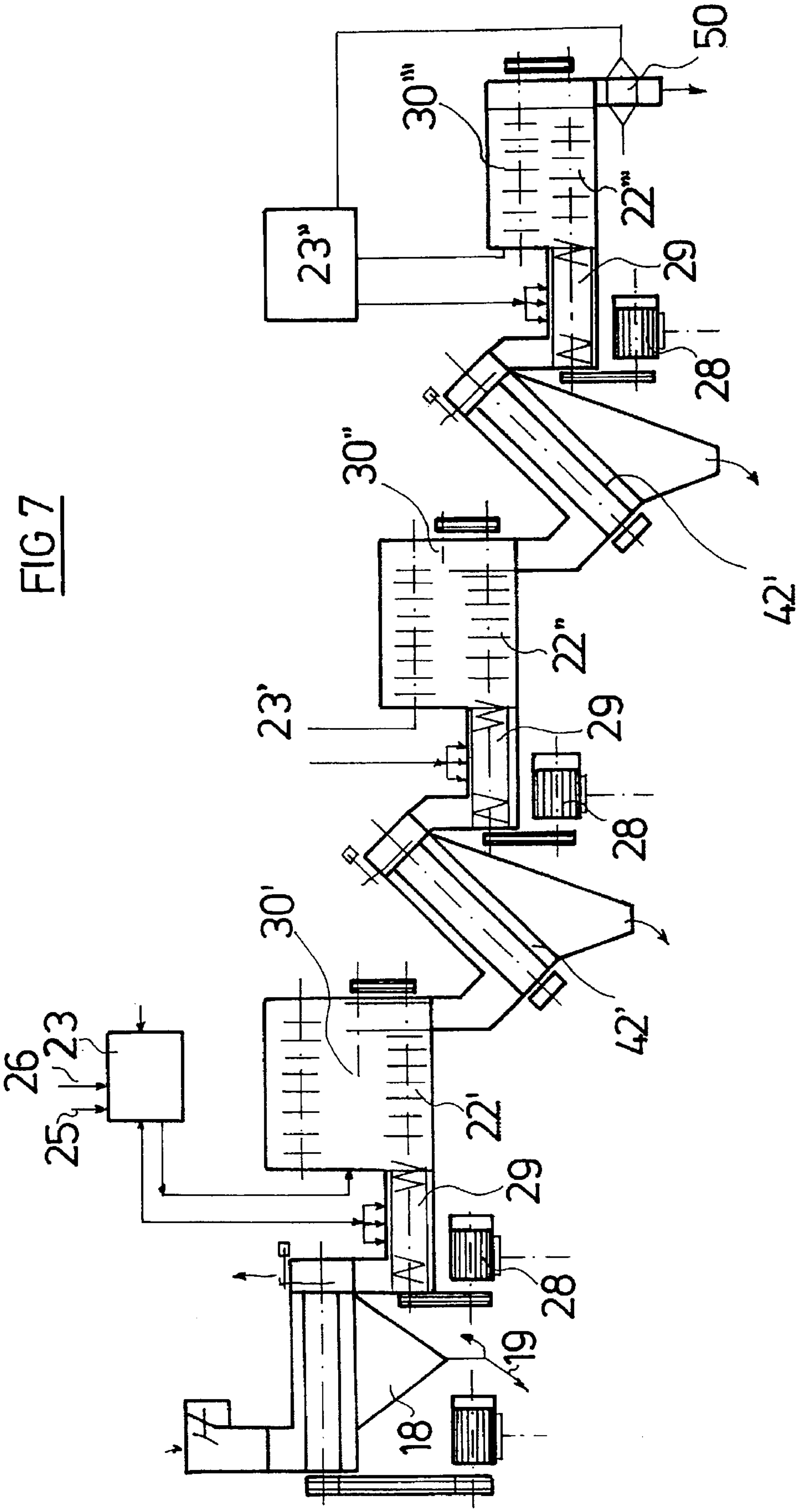
FIG. 7 shows a further constructional form with multi-stage cleaning.

FIG. 7 shows a constructional form with multiple moist or wet scouring. The wetting device 22' or 22" respectively has an appropriately enlarged wetting chamber 30', 30" respectively, for ensuring a water action time of 1 to 10, preferably 2 to 5 minutes. During the intermediate storage the grain is intensively moved, and prepared in stages, by mechanical impact and rubbing effects. In this way it is possible to remove the desired proportion of skin material precisely, in a more careful manner, the proportion optimum for the milling products which are to be produced. As FIG. 7 also shows, the scouring machine 42' can also be arranged to convey upwards at an inclination. Advantageously, after the cleaning the quantity of water still needed for milling moisture is added via a further wetting device 22'". The water content is measured at the exit from the wetting chamber 30'", and brought to the desired value by means of a control device 23".

Tests have shown that depending on the desired quality of the end product or the raw grain mixture used therefor, the solution proposed by the invention permits of better control over and more precise pre-determining of the end products, so that the entire grinding process can be carried out with greater replicability especially with the use of a relatively high degree of automation. It is possible to keep the influencable input parameters of the stock to within a very small band width. It has been found very advantageous if the following values are continuously measured, or monitored. These are the water content, colour and ash of the cereal, moreover the temperature, the bulk weight, and possibly also the grain hardness is ascertained before or after cleaning. In many cases the conditioning time can be reduced with the new invention, without any disadvantage to the grinding.

Reference will now be made to the fragmentary-view photographs shown in FIGS. 8–13.

Figure 8:
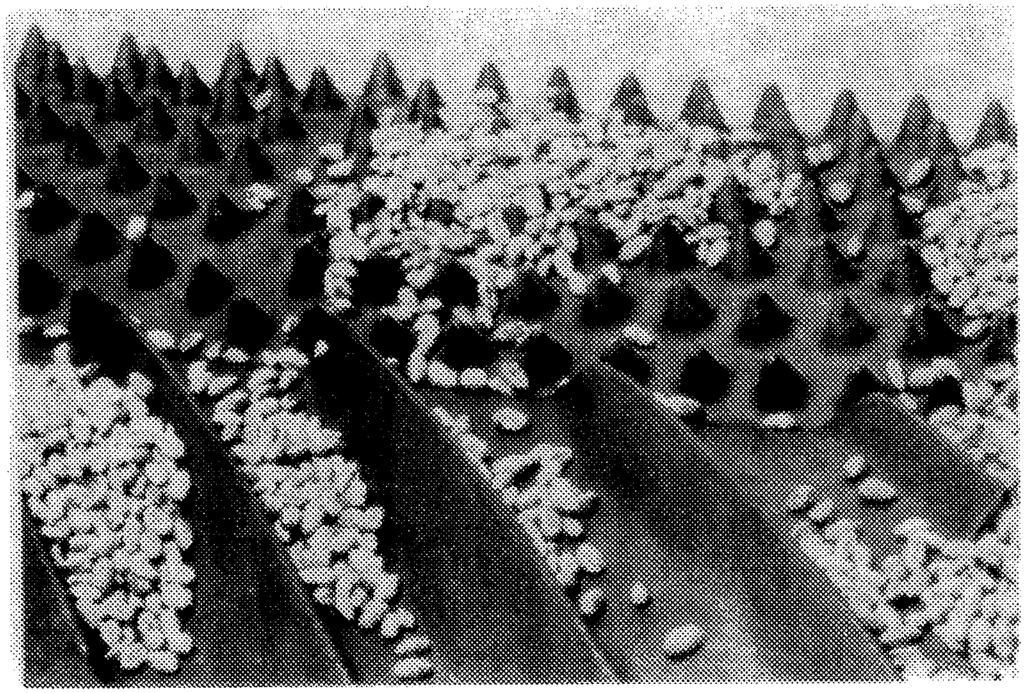
FIG. 8 shows a photograph of a comparison of an area of noses with forced-conveyance means, with a small quantity of cereal grains laid thereon by hand.
Figure 9:
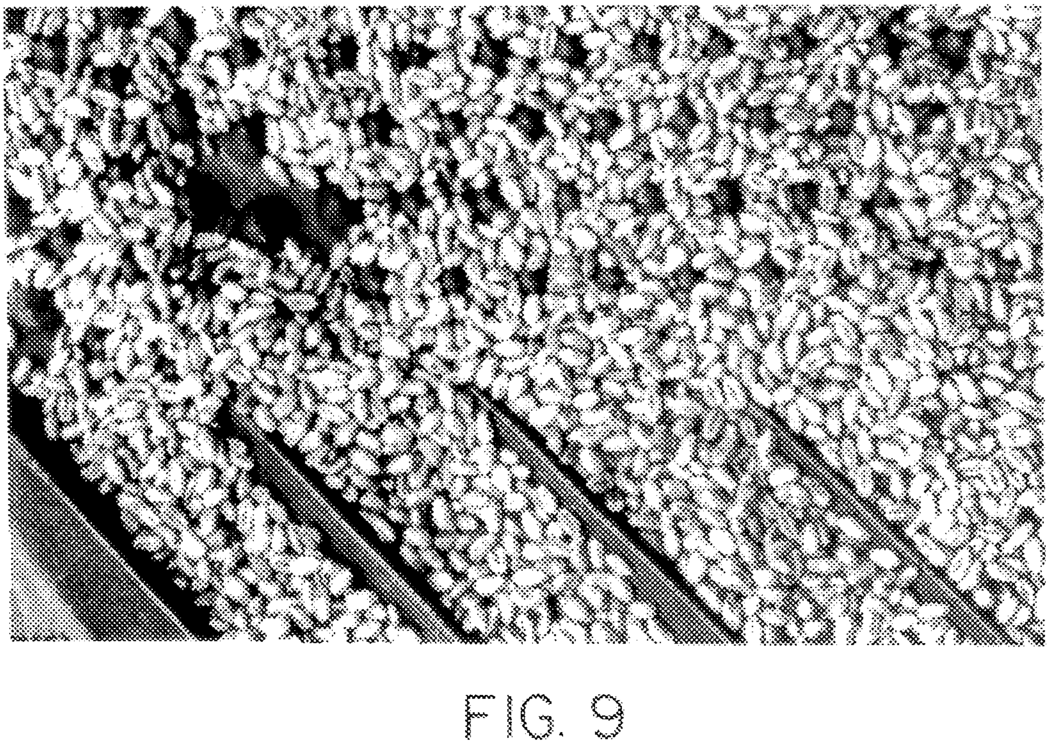
FIG. 9 shows FIG. 8 with a larger quantity of cereal grains.

FIGS. 8 and 9 show two different support strips of the scouring rotor with an area of noses and with forced-conveyance means respectively, which are constructed as parts of worm threads. The photographs show particularly clearly the size relationship between the individual grains and the working elements.

Figure 10:
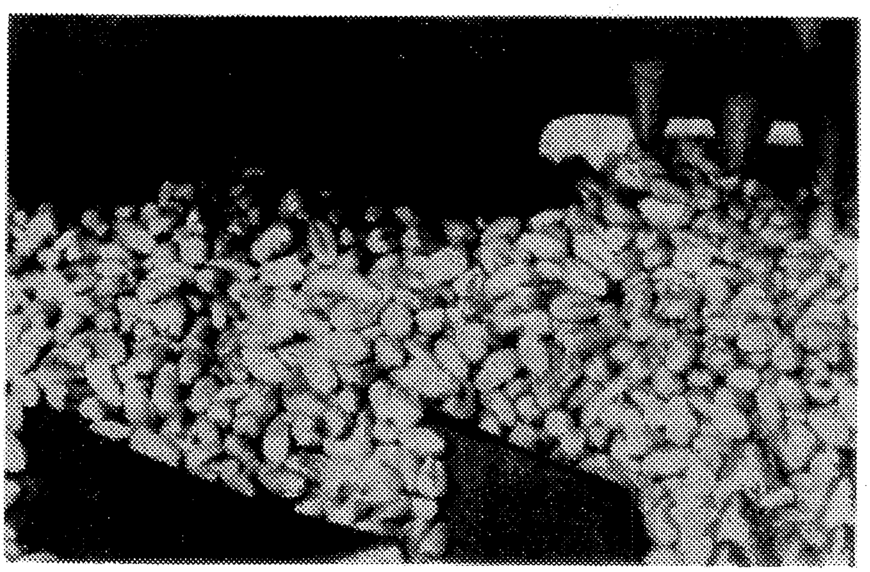
FIG. 10 is a view into the scouring chamber with the scouring shell opened.

FIG. 10 shows the transition from the feed worm into the scouring chamber proper, the scouring shell being somewhat opened. FIG. 10 and following Figures show that with the movement of the scouring rotor the individual grains are not torn open as is the case in the degerming of maize for example. The various working elements allow sufficient free space so that the individual grains can carry out a very intensive turbulent movement, which also causes the scouring effect.

Figure 11:
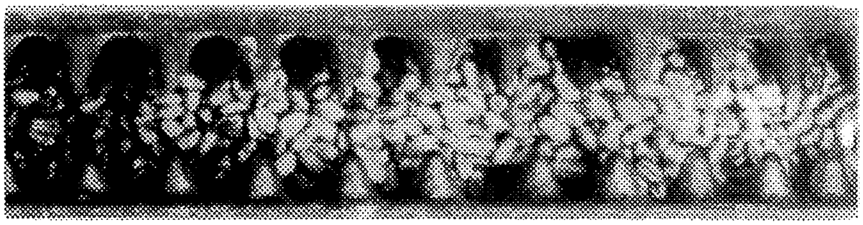
FIGS. 11–13 show a view into the scouring chamber between scouring rotor and scouring shell in a normal working position.

FIG. 11 shows the scouring chamber, the scouring rotor and the scouring shell having the same noses as working elements.

Figure 12:

FIG. 12 shows the scouring chamber, the illustrated fragment of the scouring shell being constructed as a screening area. It will be apparent that the individual grain can slip through even the narrowest place between the highest tip of the forced-conveyance means on the one hand and the screen on the other.

Figure 13:

FIG. 13 shows that scouring work is performed in the region of the screening area also by the noses of the scouring rotor.

I claim:

1. An apparatus for the scouring of cereal comprising:

a housing;

a cylindrical scouring shell disposed within the housing;

a rotor rotatably positioned within the cylindrical scouring shell and defining a scouring space between the rotor and the scouring shell, the rotor rotating about an axis and having grater sections and conveyance sections, the grater sections and conveyance sections alternating in a circumferential direction;

an inlet in the housing for receiving cereal and directing the cereal into the scouring space;

an adjustable outlet for regulating the movement of cereal through the scouring space and for removing scoured cereal.

2. The apparatus for the scouring of cereal of claim 1 wherein the scouring shell has a plurality of screen sections and grater areas, the screen sections and the grater areas alternating in a circumferential direction.

3. The apparatus for the scouring of cereal of claim 2 wherein the grater areas in the scouring shell are adjustable in a radial direction to adjust a width of the scouring space.

4. The apparatus for the scouring of cereal of claim 2 wherein the housing has a collection hopper to collect material scoured from the cereal and passing through the screen sections of the scouring shell.

5. The apparatus for the scouring of cereal of claim 1 wherein the rotor has a feed screw configuration near the inlet to move the cereal into the scouring space.

6. The apparatus for the scouring of cereal of claim 5 wherein the feed screw configuration and the conveyance sections are in continuity and cooperate to move the scoured cereal axially toward the outlet.

7. The apparatus for the scouring of cereal of claim 1 wherein the grater sections and the grater areas comprise a plurality of noses.

8. The apparatus for the scouring of cereal of claim 1 wherein the scouring space has a width of 5–15 mm and the noses have a height of 5–15 mm.

9. A method for scouring cereal comprising the steps of:

feeding cereal into an inlet in a housing, the housing having a cylindrical scouring shell and a rotor rotatably positioned within the cylindrical scouring shell and defining a scouring space between the rotor and scouring shell, the rotor having a feed screw configuration near the inlet and at least one grater section and conveyance section, and the scouring shell having at least one grater area and at least one screen section;

rotating the rotor about an axis, the rotating step including the steps of:

packing of the cereal into the scouring space with the feed screw configuration on the rotor;

imparting movement between individual grains of the cereal with the grater sections and grater areas to remove only an outermost skin of the grains by interaction between grains and interaction of grains with the grater sections and grater areas wherein the grains remain intact; and imparting axial movement to the cereal with the conveyance sections of the rotor; and adjusting an outlet to regulate the movement of cereal through the scouring space and to remove the scoured cereal.

10. The method for scouring cereal of claim 9 further comprising the step of removing material scoured from the cereal through the at least one screen section of the scouring shell.

11. A method for scouring and preparing of cereal for milling in a plurality of stages comprising the steps of:

dry-scouring the cereal in a first stage;

wetting the dry-scoured cereal in a second stage, the wetting step including adding water in a dosed amount to the dry-scoured cereal to achieve a predetermined milling moisture in the cereal;

storing the wetted, scoured cereal for a period of about 1–120 minutes in a third stage;

additionally scouring the wetted, scoured cereal in a fourth stage; and storing the wetted, twice-scoured cereal in conditioning compartments prior to milling.

* * * * *

UNITED STATES PATENT AND TRADEMARK OFFICE

CERTIFICATE OF CORRECTION

PATENT NO.: 5,650,018

DATED: July 22, 1997

INVENTOR(S): Roman MÜLLER

It is certified that an error appears in the above-identified patent and that said Letters Patent is hereby corrected as shown below:

On the title page, item [54] and column 1, line 2

<u>IN THE TITLE</u>:

"SCORING" should read --SCOURING--.

<u>IN THE CLAIMS</u>:

Claim 7, col. 10, line 43, "claim 1" should read --claim 2--.

Claim 8, col. 10, line 46, "claim 1" should read --claim 7--.

Signed and Sealed this

Twenty-third Day of September, 1997

*Attest:*

BRUCE LEHMAN

*Attesting Officer* *Commissioner of Patents and Trademarks*